United States Patent Office.

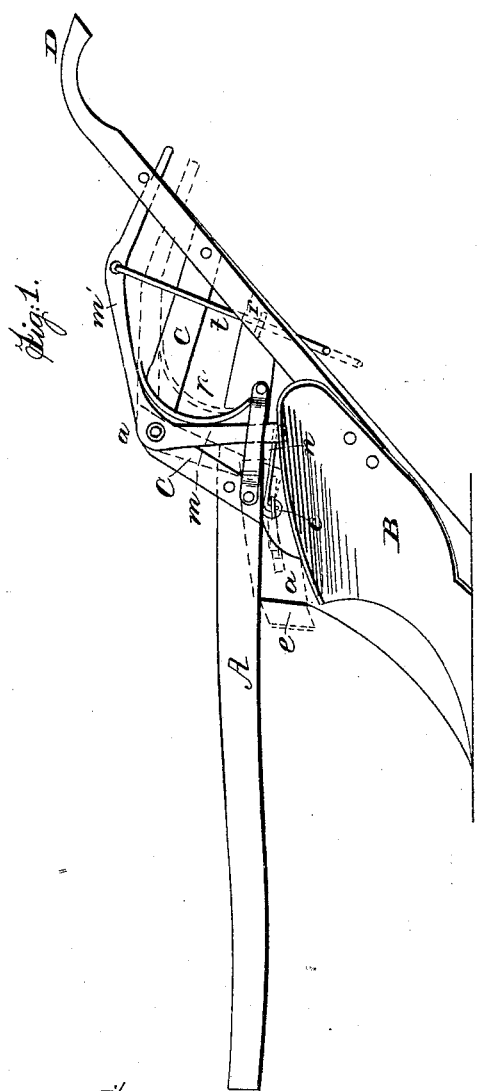

J. AND E. P. MILES, OF BLOOMINGDALE, INDIANA.

Letters Patent No. 61,083, dated January 8, 1867.

IMPROVEMENT IN PLOUGHS.

The Schedule referred to in these Letters Patent and making part of the same.

TO ALL WHOM IT MAY CONCERN:

Be it known that we, J. and E. P. MILES, of Bloomingdale, in the county of Parke, and State of Indiana, have invented a new and useful Improvement in Ploughs; and we do hereby declare that the following is a full, clear, and exact description thereof, which will enable others skilled in the art to make and use the same, reference being had to the accompanying drawings forming part of this specification, in which—

Figure 1 is a side view of a plough with our improved device for cleaning it attached.

Figure 2 is a top view of the same.

Similar letters of reference indicate like parts.

This improvement relates to a device for preventing a plough from being choked and clogged with grass, weeds, &c., in front of the mould-board. It consists of a curved slide plate secured to the land side of the plough-beam, and operated by a lever extending to the handles of the plough which is completely under the control of the driver, who can keep the plough clear of trash by simply bearing on the end of the lever. The working parts are so placed on the inside of the beam as to be out of the way of danger when the plough is thrown down.

A broad curved iron plate, $a$, is attached to the beam A, on the land side, the forward end of which plate is under the beam and fastened to the neck of the mould-board, B. The plate $a$ is slotted longitudinally, as shown in fig. 1, and in the slot is a bolt, $c$, to which is attached a sliding-plate, $e$, which fits on the outside of the fixed plate $a$. A frame-piece, C, extends from the beam A to the land-side handle D, upon which frame-piece is pivoted an elbow lever at $d$, having one arm, $m$, reaching downward, and connected at the end by a rod, $n$, with the inside of the bolt $c$, while the other or long arm, $m'$, reaches backward to the handles of the plough. The slot arm $m$ of the elbow lever works within a guide, $s$, fastened on the inside of the plough-beam, and the long arm $m'$ has a guide-rod, $t$, running down through a projection, $r$, on the back end of the beam. It will be seen that when the long arm $m'$ is depressed a little that it will move the slide-plate $e$ forward, so that the front end will pass by the neck of the plough, and thus push out of the way any grass or trash which may catch at that point to clog and choke the plough. This movement may be made by the driver with his hand on the end of the lever, or with his foot on a hook at the lower end of the guide-rod $t$. In order to replace the sliding-plate $e$, as soon as the movement is made and the trash is removed from the neck of the plough, a spring, $p$, is provided to push the arm $m'$ back to its place, which may be either a curved flat spring as represented, or a spiral spring placed upon the guide-rod $t$.

Having described the construction and operation of our invention, we claim as new, and desire to secure by Letters Patent—

The arrangement of the curved sliding-plate $e$, connected with the elbow lever arm $m$, by the rod $n$, and operated by the arm $m'$, in combination with the spring $p$, or its equivalent, for cleaning a plough of grass and weeds, substantially as herein described.

J. MILES,
E. P. MILES.

Witnesses:
STEPHEN BREED,
LEVI SMITH.